May 14, 1946. L. J. GORDON 2,400,407
SCRIBER
Filed Feb. 1, 1943
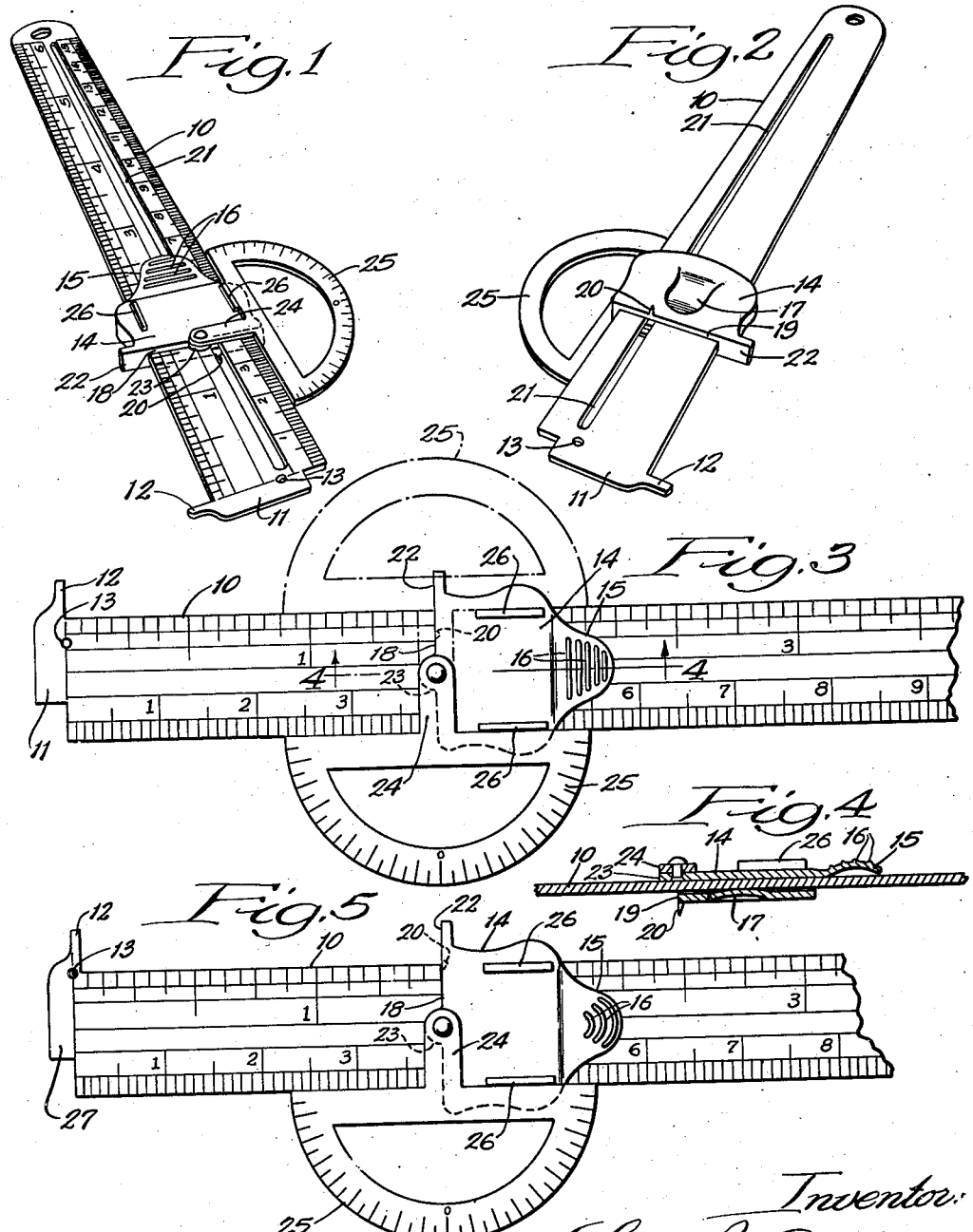
Inventor:
Louis J. Gordon,
By McCabe, ... Dickinson
Attorneys.

Patented May 14, 1946

2,400,407

UNITED STATES PATENT OFFICE 2,400,407

SCRIBER

Louis J. Gordon, Chicago, Ill.

Application February 1, 1943, Serial No. 474,246

5 Claims. (Cl. 33—27)

This invention relates to scales or rulers and includes an attachment for a scale or ruler whereby the scale way be readily adapted for drawing circles or radius accurately determined by the markings on the scale.

My attachment includes the slider which is adapted to be located around the scale so that it can be slid longitudinally thereon. Projecting downwardly from the lower side of my slider, is a sharp pointed projection which is adapted to serve as a center when the scale is used in drawing circles.

The scale is provided with an opening for the reception of a pencil point. This opening is in longitudinal alignment with the centering projection on the scale so that the distance between the pencil opening and the centering point is always identical with the displacement along the length of the scale between the opening and the point.

The pencil opening in the scale may suitably be located at the zero position of the scale and the scale may be extended beyond this zero point in order to accommodate the opening. It will of course be understood that the pencil opening may be located at any desired point, other than the zero point, in the length of the scale, although the opening is preferably located at the zero point, since it enables the radius of the circle to be more easily determined with the aid of the markings on the scale.

My slider is preferably arranged with a straight upper edge in the transverse direction of the scale and this upper edge is in alignment with the centering point, located on the underside of the scale.

Consequently, when the slider is placed so that the straight upper edge is on the 1½" mark, for example, then the centering point is displaced from the pencil opening by exactly one and one-half inches. Owing to the co-alignment of the point and the opening in a direction parallel to the length of the scale, the correspondence of the spacing between the pencil opening and the centering point and the reading of the scale is preserved even in the case of very small circles.

In the case of scales of transparent material, the centering point may be viewed through the scale so that it can be located precisely at the point on the paper which is to be the center of the circle. In the case of metal scales, I prefer to provide therein a longitudinal slot through which the centering point may be viewed.

In one embodiment of my invention I locate the centering point on the slider in alignment with one edge of the scale and I provide the pencil opening preferably at the zero point of the scale, and with its center located in alignment with the same edge of the scale. In this case my scale is provided with an enlargement which extends inwardly of the zero mark to a slight extent to provide metal for the formation of the pencil opening. This modification can be used with metal or other non-transparent scales since the centering point can be viewed from above when it is being applied to the paper.

I prefer to mount on my slider a protractor so arranged that its base line may be brought into alignment with either edge of the scale. This protractor has an arm whereby it is pivoted on the center line of the slider. The center of the mounting pivot of this arm is preferably located in alignment with a straight transverse edge on the upper side of the slider so that the center of the protractor may be located exactly above the point at which the straight edge intersects the effective edge of the scale.

My scale and the slider may be provided with suitable projections to enable my assembly to be used as inside and outside calipers. Owing to the pivotal mounting of the protractor, the same may be moved into a suitable position to enable the scale to be used for drawing circles or for caliper measurements.

My invention will more readily be understood from the following description of preferred embodiments taken in conjunction with the accompanying drawing in which:

Figure 1 is a perspective view of a metal scale provided with a slider embodying my invention;

Fig. 2 is a perspective view of the underside of the assembly;

Fig. 3 is a plan view of a similar assembly employing a scale of transparent material;

Fig. 4 is a sectional detail view taken on the line 4—4 of Fig. 3; and

Fig. 5 is a similar view of a modification of my invention adapted for use with transparent or non-transparent scales.

Referring to Figs. 1 and 2 of the drawing, the reference numeral 10 designates a scale which may be marked in any suitable dimensions, for example inches on one side and centimeters on the other. In this modification the scale may suitably be of steel or other suitable metal. Beyond the zero point of the scale I provide an extension 11, one side of which may extend to provide a caliper member 12. Along the zero line of the scale I provide a small opening 13 which is adapted to receive a pencil point for the purpose of drawing circles.

Slidably mounted on the scale is a slider 14 which has a snug sliding fit thereon. This slider may suitably be formed of metal and it is provided at one end on its upper side with a thumb piece 15 whereby it may be adjusted to desired position along the scale. The thumb piece 15 is preferably formed with ridges 16 to provide non-slip engagement with the thumb.

On its underside the slider 14 is provided with a tongue 17 which is arranged to provide desired friction between the slider and the scale. This tongue may suitably be formed by cutting or stamping out a portion of the metal constituting the lower part of the slider and this tongue is curved upwardly slightly as shown in Fig. 4 to give the desired degree of friction.

The upper side of the slider 14 is formed with a straight edge 18 arranged at right angles to the length of the scale. The underside of the scale is preferably formed with a straight edge 19 in alignment with the straight edge 18.

On the lower side of the scale I form a centering projection 20 with a point which is in alignment with the straight edge 18. Consequently, when I locate the straight edge 18 at a definite position on the scale, the centering point 20 has its pointed end located at the indicated distance from the zero point of the scale.

The pencil opening 13 is located exactly in longitudinal alignment with the point 20 so that the distance between the center of the opening 13 and the point 20 lies in the longitudinal direction of the scale and is exactly equal to the distance indicated by the straight edge 18 on the indicia of the scale. This relation remains true even if the distance becomes very small.

As shown in Figs. 1 and 2, I provide a longitudinal slot 21 along the major length of the scale and in alignment with the point 20 so that this point may be viewed through the slot 21 whenever it is being applied to a center point on the paper. The slot 21 terminates short of the opening 13, so that this opening can be used for the reception of a pencil.

At one edge of the slider 14 I prefer to provide a caliper member 22 in alignment with the caliper member 12. The near sides of the caliper members 12 and 22 may be arranged in alignment with the zero line of the scale and with the straight edge 18 so that the straight edge 18 may be used for reading the caliper distances. The members 12 and 22 may suitably have a combined thickness of an exact amount, for example 1/8", so that an outside caliper distance may be computed by merely adding 1/8" to the reading on the scale indicated by the straight edge 18.

At the center of the straight edge 18, and in alignment with the center of the scale, I provide on the slider 14 an ear 23 whereby I pivotally mount an arm 24 which extends inwardly from the center of the base of a protractor 25. The arm 24 is of sufficient length so that the protractor may be swung from one side to the other, as shown in Fig. 3, so as to bring the base of the protractor in alignment with either edge of the scale 10.

Abutments 26 on the upper side of the slider 14 are arranged to engage the protractor so as to define these two positions accurately. The pivot whereby the protractor arm 24 is mounted on the ear 23 is located on the center line of the scale and in alignment with the straight edge 18. Consequently, the two operative positions of the protractor locate the center point of the protractor at the intersection of the edge 18 with the adjacent edge of the scale 10.

To use the protractor, one edge of the scale is laid along a base line and moved therealong to bring the straight edge 18 in alignment with the point of origin of the angle on the base line. The protractor is then swung around its pivot so as to bring the base of the protractor into alignment with said base line and the desired angle is marked on the paper. The scale may then be used to join the point of origin to the point of marking.

In order that the lug 23 may not obscure the draftsman's view of the point 20, the point 20, the opening 13 and the slot 21 are located to one side of the center of the scale as shown in Figs. 1 and 2.

In the modification illustrated in Fig. 3, a transparent scale is employed and consequently it is unnecessary to provide a slot such as the slot 21 shown in Figs. 1 and 2.

In the embodiment shown in Fig. 5, the center of the pencil opening 13 is located in alignment with one edge of the scale 10 and in alignment with the zero line on the scale, this opening being located within an extension 27 of the scale, which extension extends inwardly of the zero mark and beyond said edge of the scale.

The centering point 20 is located in alignment with the straight edge 18 and in alignment with said edge of the scale so that the pencil opening 13 and the centering point 20 lie in longitudinal alignment relative to the length of the scale. In this embodiment the point 20 can be seen from above and it may be readily located at the desired circle center.

For the purpose of drawing circles, the operation is the same in all embodiments. The slider 14 is moved along the scale by means of the thumb piece 15 until the straight edge 18 registers with the reading on the scale corresponding to the desired radius. The point 20 is then applied to the desired center of the circle and the thumb is applied to the slider 14 above the point so as firmly to engage it with the paper. A pencil point is then inserted at the opening 13 and the scale is then swung around the centering point 20 until the circle or the desired arc is completed by the pencil.

Although my invention has been described in connection with specific details of a preferred embodiment thereof, it must be understood that such details are not intended to be limitative of the invention except in so far as set forth in the accompanying claims.

I claim:

1. In combination, a scale, a slider slidably mounted thereon, said slider having a straight edge whereby it may be located in definite position relative to said scale, a centering point on said slider projecting downwardly therefrom, said point being in alignment with said straight edge, said scale having a pencil opening at a definite position on said scale and in longitudinal alignment with said centering point, said centering point being visible from the upper side of said slider and scale, and a protractor having a pivotal mounting on said slider so as to be swung into positions with its base in alignment with each edge of said scale, said pivotal mounting being in alignment with said straight edge, and said centering point and opening being displaced from the center of the scale out of alignment with said pivotal mounting whereby the protractor can be moved into position to permit viewing of said centering point.

2. In combination, a scale, a slider slidably mounted thereon, said slider having a straight edge whereby it may be located in definite position relative to said scale, a centering point on said slider projecting downwardly therefrom, said point being in alignment with said straight edge, said scale having a pencil opening at a definite position on said scale and in longitudinal alignment with said centering point, said scale having a longitudinal slot in alignment with said centering point whereby said centering point may be viewed through said slot from the upper side of said scale, and a protractor having an arm pivoted to a point on said slider in alignment with said straight edge and with the longitudinal center line of the scale, said arm being of sufficient length to permit the protractor to be swung with its base in alignment with either edge of the scale, said centering point, pencil opening and slot being displaced from the longitudinal center line of the scale to permit the protractor to be moved clear of said slot.

3. In combination, a scale, a slider slidably mounted thereon, said slider having a straight edge whereby it may be located in definite position relative to said scale, a centering point on said slider projecting downwardly therefrom, said point being in alignment with said straight edge, said scale having a pencil opening at a definite position on said scale and in longitudinal alignment with said centering point, said scale having a longitudinal slot in alignment with said centering point whereby said centering point may be viewed through said slot from the upper side of said scale, and a protractor having an arm pivoted to a point on said slider in alignment with said straight edge and with the longitudinal center line of the scale, said arm being of sufficient length to permit the protractor to be swung with its base in alignment with either edge of the scale, and abutment means on said slider arranged to engage the protractor on both said positions, said centering point, pencil opening and slot being displaced from the longitudinal center line of the scale to permit the protractor to be moved clear of said slot.

4. In combination, a scale, a slider slidably mounted thereon, a protractor having an arm pivoted to said slider at a point in alignment with the longitudinal center line of said scale, said arm being of sufficient length that the protractor can be swung into two positions with its base line in alignment with either edge of said scale, and abutment means arranged to be engaged by said protractor in both said positions.

5. In combination, a scale, a slider slidably mounted thereon, a protractor having an arm pivoted to said slider at a point in alignment with the longitudinal center line of said scale, said arm being of sufficient length that the protractor can be swung into two positions with its base line in alignment with either edge of said scale, abutment means arranged to be engaged by said protractor in both said positions, and means on said slider in transverse alignment with the pivotal center of said protractor arranged to intersect the edge of the scale at the position occupied by the center of the protractor in either of said positions.

LOUIS J. GORDON.